US012640891B2

(12) United States Patent
Nielsen et al.

(10) Patent No.: US 12,640,891 B2
(45) Date of Patent: May 26, 2026

(54) CHANNEL FILTERING IN A USER EQUIPMENT

(71) Applicant: Nokia Technologies Oy, Espoo (FI)

(72) Inventors: Kim Nielsen, Storvorde (DK); Faranaz Sabouri-Sichani, Aalborg (DK); Iwajlo Angelow, Buffalo Grove, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 734 days.

(21) Appl. No.: 17/957,292

(22) Filed: Sep. 30, 2022

(65) Prior Publication Data

US 2023/0118653 A1 Apr. 20, 2023

(30) Foreign Application Priority Data

Oct. 18, 2021 (EP) .................................... 21203202

(51) Int. Cl.
*H04L 5/00* (2006.01)
*H04L 27/26* (2006.01)
(52) U.S. Cl.
CPC .......... *H04L 5/0092* (2013.01); *H04L 5/0064* (2013.01); *H04L 27/26025* (2021.01)
(58) Field of Classification Search
CPC ................. H04L 5/0092; H04L 5/0064; H04L 27/26025; H04B 1/1036; H04B 1/1638; H04B 1/1027
See application file for complete search history.

(56) References Cited

U.S. PATENT DOCUMENTS 10,440,608 B2 10/2019 Ye
11,296,842 B2 * 4/2022 Wang .................... H04W 28/20
2014/0018070 A1 1/2014 Ji et al.
(Continued)

FOREIGN PATENT DOCUMENTS

WO WO 2005/064808 A1 7/2005

OTHER PUBLICATIONS

R. Veljanovski, J. Singh, and M. Faulkner, "A Channel Filter With Variable Adjacent Channel Selectivity For UTRA-FDD/TDD", The 14th IEEE 2003 International Symposium on Personal,Indoor and Mobile Radio Communication Proceedings, pp. 55-59 (Year: 2003).*
3GPP Standard, Technical Report "3GPP TR 38.844", v0.0.4, Sep. 9, 2021 p. 1-18, XP052056497.
(Continued)

*Primary Examiner* — Noel R Beharry
(74) *Attorney, Agent, or Firm* — LIPPES MATHIAS LLP

(57) ABSTRACT

A user equipment, method and computer program for adjusting an effective centre frequency of channel filter in a user equipment to improve the adjacent selectivity when the network is transmitting on an irregular bandwidth channel and the user equipment is receiving the signal via a channel filter that has a wider pass band than the bandwidth of the channel. The method comprises filtering received wireless communication signals at a channel filter. Identifying a preferred centre frequency for the channel filter by: adjusting a centre frequency of the channel filter; determining a level of adjacent channel selectivity of signals filtered by the channel filter; comparing a level of adjacent channel selectivity at different centre frequencies of the channel filter; and identifying the preferred centre frequency as the centre frequency that provides a highest level of adjacent channel selectivity.

17 Claims, 5 Drawing Sheets

(56) References Cited

U.S. PATENT DOCUMENTS

| | | | |
|---|---|---|---|
| 2016/0006972 A1 | 1/2016 | Fujimura | |
| 2020/0228265 A1 | 7/2020 | Wang et al. | |
| 2021/0091897 A1 | 3/2021 | Gheorghiu et al. | |
| 2021/0127284 A1* | 4/2021 | Abdelmonem | H04W 24/08 |
| 2021/0194648 A1 | 6/2021 | Bassirat et al. | |
| 2022/0311423 A1* | 9/2022 | Gathman | H03H 11/22 |

OTHER PUBLICATIONS

3GPP TSG-RAN WG4 Meeting # 100-e, Nokia Shanghai Bell, "On the use of overlapping channel bandwidths from UE perspective" R4-2114367, Aug. 16-27, 2021, 6 pages.

3GPP RAN WG4 Meeting #100-e, Intel Corporation, "Views on the Overlapping CBW from UE and Network perspective" R4-2113162, Aug. 16-27, 2021, 4 pages.

3GPP RAN WG4 Meeting #100-e, Apple, Skyworks Solutions Inc., "TP on using next larger channel bandwidth solution" R4-2112365, Aug. 16-27, 2021, 3 pages.

ZTE Corporation, "Discussion on irregular channel bandwidth for NR system", R4-2101959, 3GPP TSG-RAN WG4 Meeting#98-e, Jan. 25-Feb. 5, 2021, 3 pgs.

Ericsson, "Utilizing immediate wider bandwidth than the operator licensed bandwidth", R4-2104587, 3GPP TSG-RAN4 Meeting #98-bis-e, Jan. 25-Feb. 5, 2021, 6 pgs.

Huawei, "TP on overlapping UE channel bandwidths", R4-211500, 3GPP TSG-RAN WG4 Meeting #100-e, Electronic Meeting, Aug. 16-27, 2021, 15 pgs.

Meng, "Research and implementation of peer to peer (P2P) wireless transceiver baseband algorithms", Dissertation Submitted to Huazhong Univ. of Science & Technology, Wuhan, CN Oct. 28, 2009, 130 pgs.—see Engl. Abstr (p. 6 & 7; labeled p. III & p. IV).

* cited by examiner

Channel filter of standardized bandwidths in radio receiver

Downlink Radio channel of any supported bandwidth gNB

Device

Lowest standardized channel bandwidth
Irregular channel bandwidth (combined carriers)
Highest standardized channel bandwidth Bandwidth

PRB

Supported legacy CBW
Carrier 1

Carrier 2
Supported legacy CBW

Next wider BW

ACS     IR BW

A: $f_{c,filter} = f_{c,carrier}$

B: $f_{c,filter} = f_{c,carrier} - (BW_{next\ wider} - BW_{configered})/2$

C: $f_{c,filter} = f_{c,carrier} + (BW_{next\ wider} - BW_{configered})/2$

CHANNEL FILTERING IN A USER EQUIPMENT

TECHNOLOGICAL FIELD

Various example embodiments relate to channel filtering in a user equipment and in particular, to providing irregular bandwidth support at a user equipment by appropriate configuration of the receiver and channel filter.

BACKGROUND

User equipment may have channel filters configured to receive signals within predefined bandwidths. The filters are generally configured so that the bandwidths align to the bandwidths of new radio NR channels.

In order to efficiently use the licensed spectrum, radio channels with "irregular" bandwidth may be used. These are channels that have bandwidths that are not aligned with existing NR (new radio) channel bandwidths. Although this may enable the spectrum to be more efficiently used, the filters of user equipment may not be adapted to these irregular bandwidths. One solution may be for the user equipment to use the next wider bandpass filter, that is a filter where the pass band is wider than the bandwidth of the channel, so that the whole channel is received. A drawback of this is that as the filter extends beyond the channel, signals from neighbouring channels which appear as noise will be received.

It would be desirable to be able to efficiently use the spectrum of the licensed band without unduly increasing the noise received at a user equipment from adjacent channels.

BRIEF SUMMARY

The scope of protection sought for various embodiments of the invention is set out by the independent claims. The embodiments/examples and features, if any, described in this specification that do not fall under the scope of the independent claims are to be interpreted as examples useful for understanding various embodiments of the invention.

According to various, but not necessarily all, embodiments of the invention there is provided according to a first aspect an apparatus, comprising: at least one means for filtering wireless communication signals received on a channel, said means for filtering passing signals within a predefined bandwidth and attenuating signals that are outside of said predefined bandwidth; means for identifying a preferred centre frequency for said at least one means for filtering, said means for identifying comprising: means for adjusting an effective centre frequency of said at least one means for filtering; means for determining a level of adjacent channel selectivity of signals filtered by said at least one means for filtering; means for comparing a level of adjacent channel selectivity at different centre frequencies of said at least one means for filtering and identifying said preferred centre frequency as said centre frequency that provides a highest adjacent channel selectivity.

The apparatus has a means for filtering that is configured to pass desired received wireless communication signals within the bandwidth of the channel for which it is configured and to filter the undesired signals outside of this bandwidth. The means for filtering may function as a bandpass or lowpass filter within the channel bandwidth. In some cases it may function as a bandpass or lowpass filter that extends beyond the channel bandwidth. It should be noted that the receiver may have a down conversion means for converting the frequencies of the received channel to a lower frequency and the filtering means may receive signals from the down conversion means. Where the down conversion means is a zero-IF or homodyne conversion means then the filtering means may be a lowpass filter. Where the down conversion means is a superheterodyne conversion means then the down conversion means may convert the frequencies of the received channel to an intermediate frequency and the filtering means may be a bandpass filter.

The width of the bandwidth that is passed by the filtering means for the channel may be predefined, but the effective centre frequency of this filtering means for the channel may be adjustable. The effective centre frequency of a means for filtering a channel depends on the centre frequency of the filter relative to the centre frequency of the channel that it is filtering. Thus, the means for adjusting may change the effective centre frequency of the filtering means by reconfiguration of the filtering means, or by adjusting the centre frequency of the channel of the received signals that are sent to the filtering means.

The position of the effective centre frequency of the means for filtering may affect the Adjacent Channel Selectivity, ACS. The ACS is a measure of the ability of a radio receiver to receive a signal on the wanted channel or frequency in the presence of another signal on an adjacent frequency or channel. Thus, the ACS is affected by the signals on adjacent channels and the preferred or optimal centre frequency of the means for filtering will vary with operating conditions and in particular, with the signal level on adjacent channels. Thus, being able to determine the ACS at different centre frequencies, allows a preferred centre frequency for the means for filtering to be determined. This may be done by comparing the different levels of ACS at different configured effective centre frequencies and selecting an effective centre frequency which results in the highest adjacent channel selectivity. This may correspond to the centre frequency that provides the highest attenuation of adjacent channel interference or the centre frequency that provides the least adjacent channel interference to fall in the filter passband.

In some example embodiments, said apparatus is responsive to said means for identifying an updated preferred centre frequency to adjust a centre frequency of said means for filtering to said updated preferred centre frequency.

In some example embodiments, said means for determining said level of adjacent channel selectivity comprises a means for determining a signal to interference and noise ratio, an increase in signal to interference and noise ratio being indicative of an increase in attenuation of adjacent channel interference.

In some example embodiments, said apparatus comprises a means for controlling; said means for controlling being responsive to receipt of a network signal indicating that at least one irregular bandwidth channel that does not correspond to a bandwidth of one of said at least one means for filtering is supported by said network to: select one of said at least one means for filtering that has a wider bandwidth than said at least one irregular bandwidth; and to trigger said means for identifying to identify a preferred centre frequency for said selected means for filtering.

In some example embodiments, the network signal may be signal that simply indicates that some use of channels with irregular bandwidths is supported. In other example embodiments the network signal may be a signal indicating a change to a downlink channel comprising an irregular bandwidth. This signal may be a reconfiguration signal. The reconfiguration signal may be channel reconfiguration signal such as a RRC (radio resource configuration signal) message.

In some example embodiments, said means for adjusting is configured to adjust said effective centre frequency by: increasing said effective centre frequency by an amount equal to half the difference between a bandwidth of said selected means for filtering and said irregular bandwidth; and decreasing said effective centre frequency by said amount.

In some example embodiments, said means for controlling is configured to trigger said means for identifying said preferred centre frequency for said at least one means for filtering, in response to at least one of:

a predefined time interval;

a power of a received signal being above a predetermined level;

a signal to interference and noise ratio; and an indication that said apparatus is moving above a predetermined speed.

In some example embodiments, the means comprise: at least one processor; and at least one memory including computer program code, the at least one memory and computer program code being configured to, with the at least one processor, cause the performance of the apparatus.

According to various, but not necessarily all, embodiments of the invention there is provided an apparatus, comprising: at least one channel filter for filtering received wireless communication signals; circuitry configured to identify a preferred centre frequency for said at least one channel filter, said circuitry configured to identify comprising: circuitry configured to adjust an effective centre frequency of said at least one channel filter; circuitry configured to determine a level of adjacent channel selectivity of signals filtered by said at least one channel filter; circuitry configured to compare a level of adjacent channel selectivity at different centre frequencies of said at least one channel filter and identify said preferred centre frequency as said centre frequency that provides a highest level of adjacent channel selectivity.

In some example embodiments, said apparatus being responsive to said circuitry configured to identify identifying an updated preferred centre frequency to adjust an effective centre frequency of said channel filter to said updated preferred centre frequency.

In some example embodiments, said circuitry configured to determine said level of adjacent channel selectivity comprises circuitry configured to determine a signal to interference and noise ratio, an increase in signal to interference and noise ratio being indicative of an increase in attenuation of adjacent channel interference.

In some example embodiments, the apparatus comprises: circuitry configured to control; said circuitry configured to control being responsive to receipt of a network signal indicating that at least one irregular bandwidth channel that does not correspond to a bandwidth of one of said at least one channel filter is supported by said network to: select one of said at least one channel filter that has a wider bandwidth than said at least one irregular bandwidth; and to trigger said circuitry configured to identify to identify a preferred centre frequency for said selected channel filter.

In some example embodiments, said circuitry configured to adjust is configured to adjust said effective centre frequency by: increasing said effective centre frequency by an amount equal to half the difference between a bandwidth of said selected channel filter and said irregular bandwidth; and decreasing said effective centre frequency by said amount.

In some example embodiments, said circuitry configured to control is configured to trigger said circuitry configured to identify said preferred centre frequency for said at least one channel filter, in response to at least one of: a predefined time interval; a power of a received signal being above a predetermined level; a signal to interference and noise ratio; and an indication that said apparatus is moving above a predetermined speed.

According to various, but not necessarily all, embodiments of the invention there is provided according to a second aspect method comprising: filtering received wireless communication signals using at least one channel filter; identifying a preferred centre frequency for said at least one channel filter by: adjusting an effective centre frequency of said at least one channel filter; determining a level of adjacent channel selectivity of signals filtered by said at least one channel filter; comparing a level of adjacent channel selectivity at different centre frequencies of said at least one channel filter; and identifying said preferred centre frequency as said centre frequency that provides a highest level of adjacent channel selectivity.

In some example embodiments, said method comprises a further step of adjusting said effective centre frequency of said at least one channel filter to said preferred centre frequency.

In some example embodiments, said step of determining said level of adjacent channel selectivity comprises determining a signal to interference and noise ratio, an increase in signal to interference and noise ratio being indicative of an increase in adjacent channel selectivity.

In some example embodiments, the method comprises:

in response to receipt of a network signal indicating that an irregular bandwidth channel that does not correspond to a bandwidth of said at least one channel filter is supported by said network:

selecting one of said at least one channel filter that has a wider bandwidth than said irregular bandwidth channels; and initiating said identifying steps to identify a preferred centre frequency for said selected channel filter.

In some example embodiments, said steps of adjusting said effective centre frequency comprise: increasing said effective centre frequency by an amount equal to half the difference between a bandwidth of said selected channel filter and said irregular bandwidth channel; and decreasing said effective centre frequency by said amount.

In some example embodiments, said method comprises: performing said step of identifying said preferred centre frequency for said at least one channel filter, in response to at least one of:

a predefined time interval;

a power of a received signal being above a predetermined level;

a signal to interference and noise ratio; and an indication that said apparatus is moving above a predetermined speed.

According to various, but not necessarily all, embodiments of the invention there is provided a computer program which when executed by a processor on an apparatus is configured to control said apparatus to perform a method according to a second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

Figure 3A:
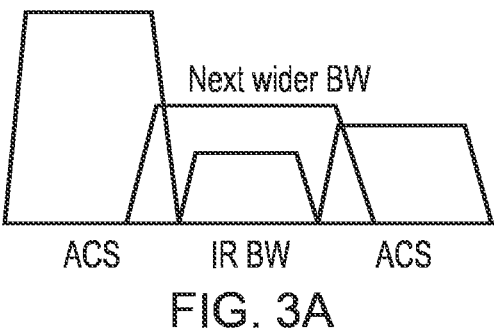
Figure 3B:
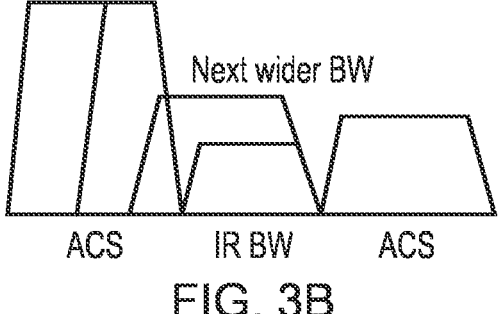
Figure 3C:
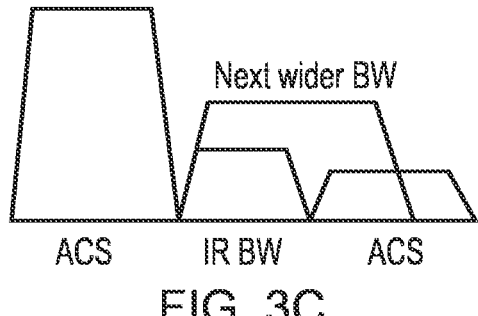
Figure 4:
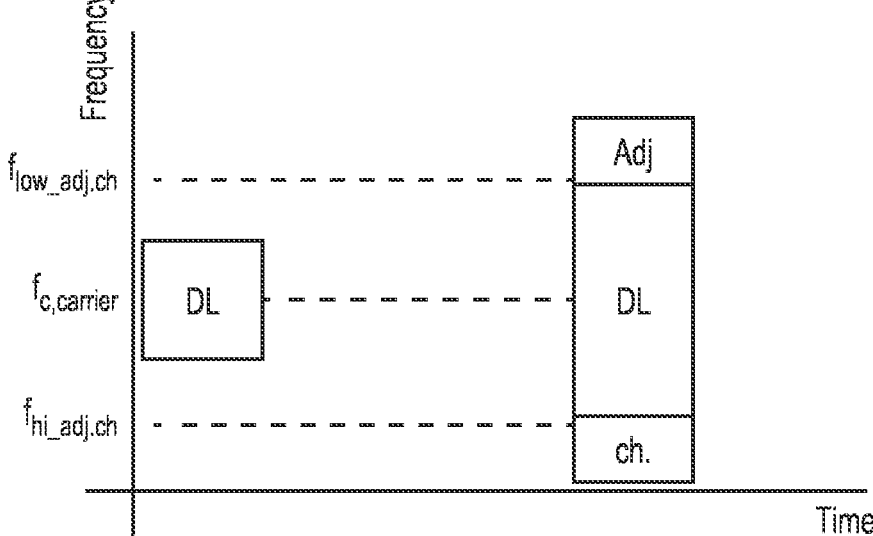
Figure 5:
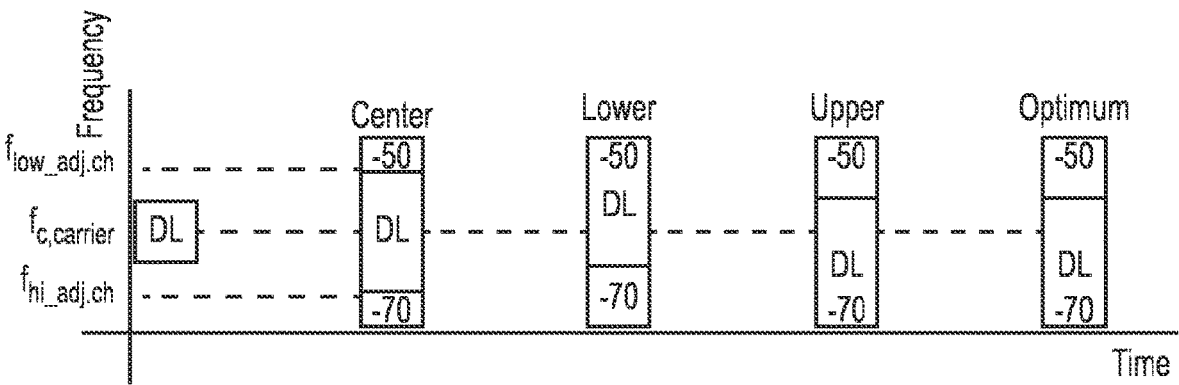
Figure 6:
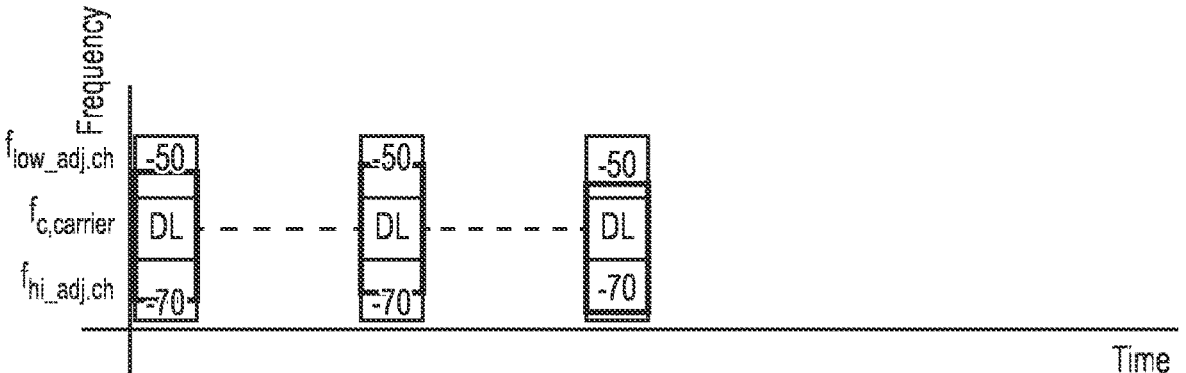
Figure 7:
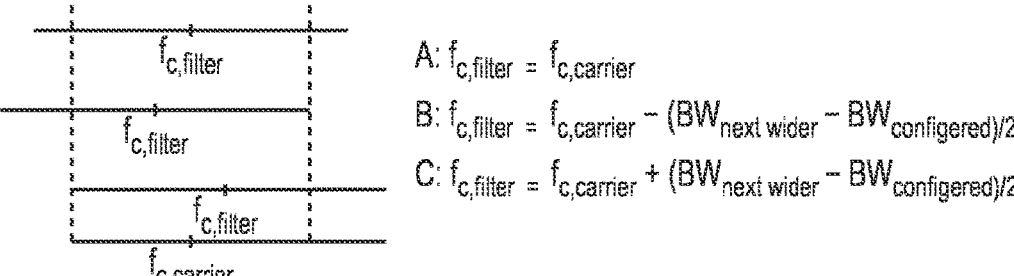
Figure 8:
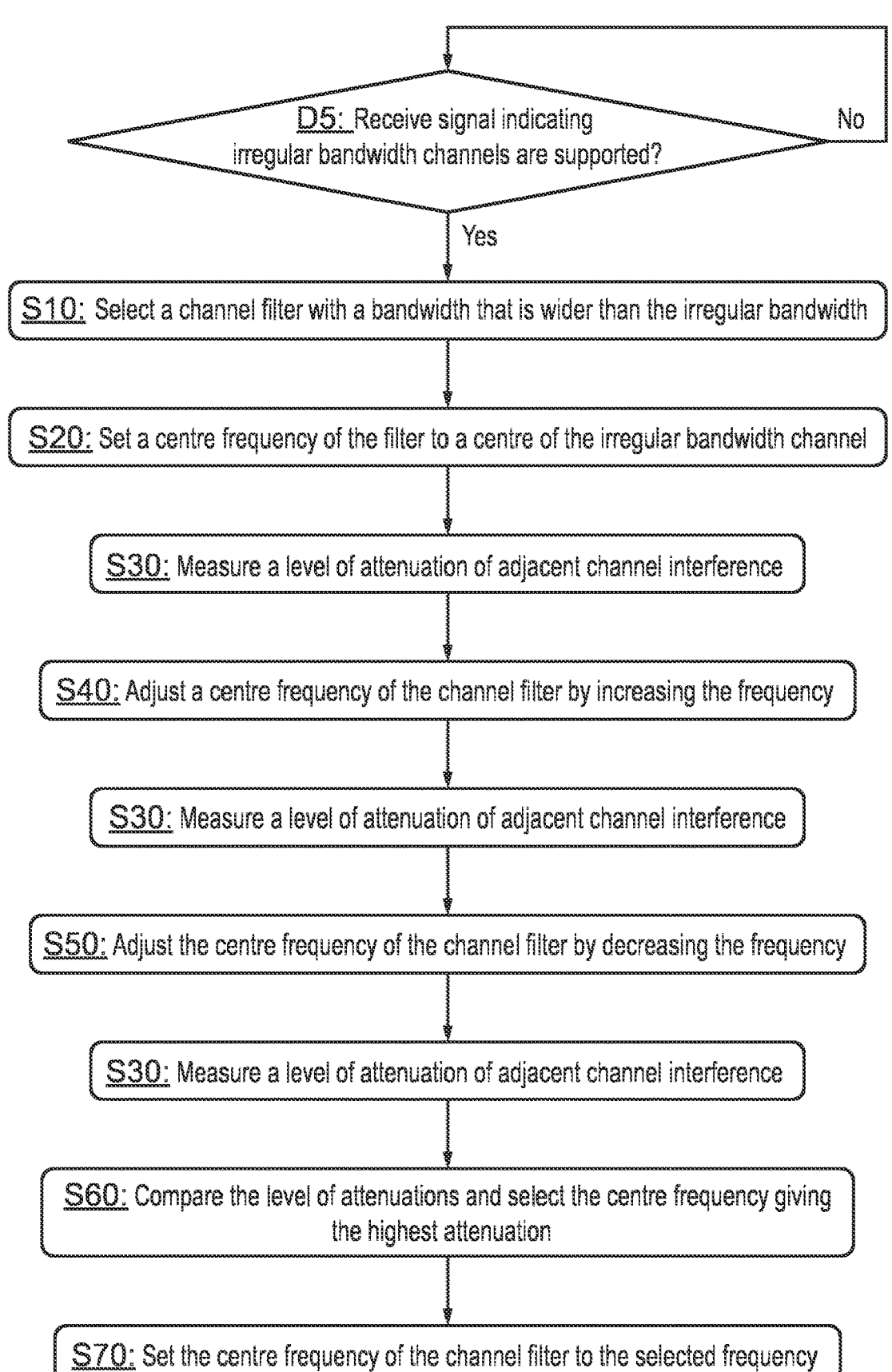
Figure 9:
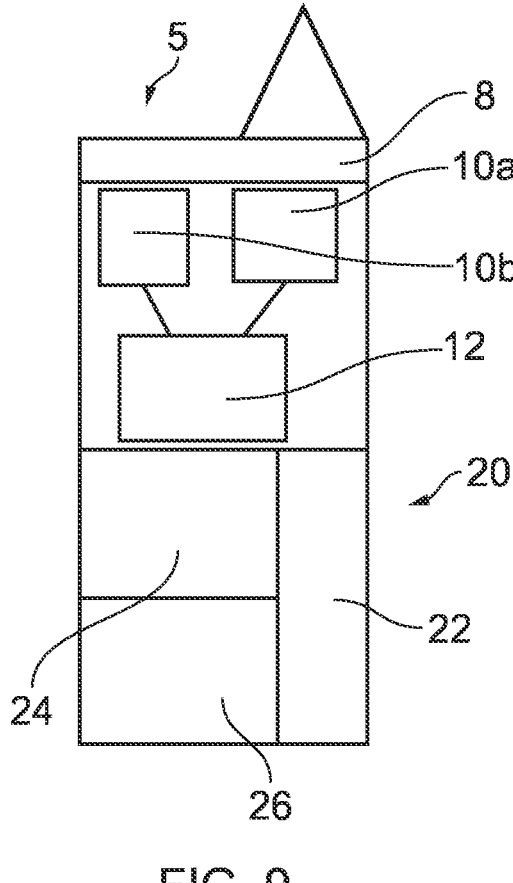

FIG. 3A to C schematically illustrate how adjacent channel selectivity may vary with the centre frequency of the channel filter;

FIG. 4 schematically illustrate receiver measurements for determining the adjacent channel selectivity using a wider bandwidth channel filter;

FIG. 5 schematically illustrates the effect of moving the centre frequency of the receiver or channel filter for channel filter optimisation;

FIG. 6 schematically illustrates continual optimisation of the channel filter based on SINR measurements;

FIG. 7 schematically illustrates the adjustment of the centre frequency of filter as a function of the centre frequency of configured carrier;

FIG. 8 schematically illustrates a flow diagram showing steps of a method according to an example embodiment; and FIG. 9 schematically illustrates a user equipment according to an example embodiment.

DETAILED DESCRIPTION

Before discussing the example embodiments in any more detail, first an overview will be provided.

Embodiments provide a way of supporting irregular bandwidth configurations at the user equipment. Networks are seeking to use new channel bandwidths in some cases bandwidths with higher granularity (compared to a conventional minimum 5 MHZ bandwidth in NR). User equipment conventionally have one or more channel filters each configured with a bandwidth corresponding to the bandwidth of one of the channels that the network conventionally supports. Where irregular bandwidths that do not correspond to the bandwidth of the channel filters are used, then receiving the signals with perhaps overlapping spectrum becomes problematic.

Example embodiments address this by selecting a wider bandpass filter than the bandwidth of the irregular channel and adjusting the effective centre frequency to a position that provides an increased adjacent channel selectivity. That is an enhanced attenuation of signals outside of the irregular bandwidth channel.

Figures 1, 2:
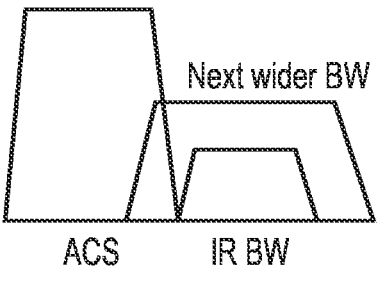
FIG. 1 illustrates how irregular bandwidth channels may be generated at the network and received at a user equipment.
FIG. 2 illustrates the adjacent channel selectivity issues that may arise where the Next wider bandwidth channel filter is selected.

FIG. 1 shows one example of how a network might support the new bandwidths by combining overlapping carriers on the gNB side. There are different ways to implement this capability such as wider channel BW (bandwidth), overlapping CA (carrier aggregation), or overlapping channel BW from the network side. One possible implementation may involve overlapping RF (radio frequency) channel BW on both the network and UE side, which gives an improved channel filtering and spectrum utilization. However, such a technique is not supported on the UE side. FIG. 1 schematically shows how the irregular BW channels are generated at the network to be received at the UE.

The problem with this enhanced concept and implementation of irregular bandwidths that accommodate the desire from Network providers that have bought spectrum that doesn't necessarily match 3GPP existing BW definitions is that the UEs are challenged when it comes to receiving overlapping spectrum properly. UE vendors are proposing that the UE could configure the channel BW as the Next wider channel bandwidth, which means if the BW is configured by the NW (network) to be e.g. 7 MHz, the UE should apply configuration of the next wider bandwidth which is 10 MHz. This approach obviously generates concerns for adjacent channel selectivity, ACS, (especially when adjacent spectrum blocks belong to a different operator, such that co-existence cannot be guaranteed), since the adjacent channel becomes insufficiently filtered. FIG. 2 schematically illustrates a UE applying a wider filter than the BW of the signal transmitted from the NW, and shows how the filter is unable to properly attenuate received signals from potentially strong adjacent channels as a portion of these signals will be received within the pass band of the channel filter.

Although this problem might be addressed by adding NW support, this would involve additionally signalling between the NW and UE with an associated overhead. Furthermore, where this becomes a network administered issue, cross alignment of UE conditions across operators would be required, particularly where UEs are at cell edges. Such proposals not only suggest new signalling but also complicated (in some cases close to impossible) tasks on NW to collect information for the required signalling.

It would be desirable if this problem could be addressed without or with only minimal signalling from the network.

Example embodiments, utilize the UE receiver capabilities in measuring ACS to self-adjust the most preferable placement of the channelization filter for a given irregular bandwidth configuration. Example embodiments are therefore focused on making an alternative to the matter of ACS handling that still allows the UEs to utilize Next wider channel bandwidth, but without the need for signalling and that supports the signal generation through overlapping RF carriers on the network side as one of the deployment options.

The reception of signals in channels of an irregular bandwidth can be supported in example embodiments even by suitably configured legacy UEs, which are configured to measure the ACS and place the effective centre frequency of the next wider channel filter at a position determined according to best SINR measurement.

The potential improvement in ACS by moving the effective centre frequency of the channel filter is schematically illustrated in FIGS. 3A to 3C. These figures show how movement of the centre frequency of the channel filter can change the amount of signal from an adjacent channel that is passed by the filter. In the example shown one of the adjacent channels has a far stronger signal than the other such that placing the channel filter so that it overlaps with the weaker signal and not the stronger signal reduces the amount of signal energy received from an adjacent channel. The shift of the effective centre frequency of the channel filter is shown in these figures by the shift of the filter bandwidth. An alternative way of adjusting the effective centre frequency of a channel filter is to displace the frequency of the received signals by a corresponding amount in the opposite direction. Where the receiver has a frequency down conversion means, then it may be cost effective to make the effective centre frequency adjustment at the down conversion means.

As can be seen, the UE would be able to evaluate the SINR for each of the three presented cases by making e.g. 3 measurements, after which it places the next wider channel BW channelization filter at the centre frequency of the channel that provides the best SINR. This approach eliminates the need for gNB monitoring and signalling to support the UE with the channel filter configuration, since the UE can do the measurements on its own. In the presented examples of FIGS. 3A to 3C the UE would choose the filter setting of FIG. 3C which results in the best SINR and the lowest interference level from adjacent channels.

Examples of how to measure and configure the ACS measurements are detailed below.

The UE may perform ACS estimations at any time, which means it could do so even if the irregular bandwidth is not configured by the network so that it would be ready for future configurations and could select the preferred position of the channel filter immediately. Where the band of operation has more frequency allocation than is currently in use, then the UE may configure the receiver with a broader receiver bandwidth (broader passband channel filter) to check the SINR as illustrated schematically in FIG. 4.

In order to avoid or at least inhibit critical degradation in on-going reception, this can be planned by UE in short periods and when it is in good signal condition, e.g. the RSRP is (reference signal to reference power) is higher than a threshold. As presented, the UE has capabilities to do the desired measurements to identify the SINR under wider BW operation. The timing of these measurements can be set in a number of ways.

It could be done continually prior to channel BW reconfiguration so that when reconfiguration occurs the UE knows the preferred centre frequency and can provide an improved next wider BW channel filter configuration immediately. Alternatively, it may be triggered at receipt of RRCReconfiguration message which updates the configured BW to an irregular BW, i.e. need for next wider BW.

For the continuous or continual case, the UE will risk signal quality during the measurement instances as it widens the RX BW, but at the same time it enables the UE to hit the next wider BW with an optimum or at least improved placement of the centre frequency of the receiver when an irregular BW is configured by the network. The UE's knowledge of the configured BW may be required for calculating the exact centre frequency required for the filter with the next wider BW, however the UE can apply the largest irregular BW and make an estimate on where the best SINR can be achieved.

For the RRCReconfiguration triggered update, the UE undergoes measurements at different centre frequencies some of which provide a worse SINR before it can place the RX filter at the preferred or optimum frequency location. The optimum placement is achieved when SINR is the best.

FIG. 5 schematically shows the strength of signal from the adjacent channel and how moving the centre frequency from a centre to a lower and then an upper frequency position brings this noise signal into the passband of the filter. The upper frequency position has the lower noise from adjacent channels and is preferred.

As a further fine tuning the UE may optionally continue to iterate new positions of the effective centre frequency of the channel filter to further balance the interference levels at either side of the channel to further improve SINR in a slot to slot process (see FIG. 6).

Should the balance of power or the presence of the adjacent channel change, the UE is able to continually shift the centre frequency of the receiver for optimum or at least improved SINR. The choice of fc,filter (Centre frequency of the channel filter) remains an internal configuration, meaning that the NW will at no point be informed of the actual centre frequency the UE is using at the channel filtering stage.

The person skilled in the art would recognise that the effective centre frequency of a channel filter may be adjusted either by changing the centre frequency of the channel filter itself, or by changing the centre frequency of the channel that is of the input signals to the channel filter. For example, it may be changed by reconfiguration of the channel filter and/or by shifting of the frequency of the input channel signal by the desired amount. In this regard the receiver in a UE may have down conversion circuitry either homodyne or heterodyne associated with it. This down conversion circuitry moves the centre frequency of the received channel to a lower frequency. Where such circuitry exists one simple way to adjust the effective centre frequency of the filter may be to simply use this circuitry to adjust the amount that the channel is shifted by.

The flow regarding the measurement and adjustment of the centre frequency of the filter—independent of when it is run can be explained as below:

1. The UE calculates the centre frequency of the filter, fc,filter which is set to the next wider BW as function of the centre frequency of the configured carrier, fc,carrier, the configured irregular BW termed BWconfigured, and the next wider BW termed BWnext wider as shown in FIG. 7.
   a. In FIG. 7 three measurements are taken but the UE may decide to make more than 3 measurements for even finer placement of fc,filter
2. Measure the SINR for each filter setting, $SINR_A$, $SINR_B$, $SINR_C$.
3. Select fc, filter corresponding to max SINR.
4. Repeat measurements periodically to refine if necessary
   a. UE may repeat at UE internally defined time intervals
   b. UE may repeat based on criteria's such as SINR or RSRP threshold or mobility state.

FIG. 8 provides a flow diagram schematically illustrating the steps regarding the measurement and adjustment of the centre frequency that are set out above. Initially at step D5 the UE is monitoring for signals and when it receives a signal indicating that irregular bandwidth channels are supported by the network it proceeds to step S10. This signal may be a general signal indicating that a portion of the network that the UE is entering supports irregular bandwidth channels or it may be a reconfiguration signal such as a RRC message indicating that the network is to use a particular irregular bandwidth channel. At step S10 the UE selects a channel filter with a bandwidth that is wider than the irregular bandwidth channel that it is concerned with. In this regard, if it has received a RRC configuration signal then it knows the irregular bandwidth that is to be used and will select a wider channel than that. Where it has simply received a signal indicating that irregular channels are supported then it will perform measurements for irregular channel bandwidths that it knows or predicts may be used by the network, such that when the network does switch to such channels then it has already determined a position for the channel filter that is optimal or at least preferred for that particular configuration.

At step S20 the centre frequency of the filter is set to a centre of the irregular bandwidth channel that is being considered. At step S30 a level of attenuation of adjacent channel interference is measured. This may be a measurement of a signal to interference and noise ratio SINR.

The centre frequency of the channel filter is then adjusted at step S40 in this case by increasing the frequency and step S30 is repeated and the level of attenuation of adjacent channel interference is again performed. At step S50 another adjustment is made to the centre frequency of the channel filter and in this case it is adjusted by decreasing the frequency to a level below the original centre frequency and again step S30 is performed and a level of attenuation of the adjacent channel interference with this centre frequency in this position is performed. These steps of adjusting the centre frequency and measuring the level of attenuation may be performed a number of times and once a required number has been performed, then at step S60 the level of attenuations for the different positions of the centre frequencies are compared and the centre frequency that gives the highest level of attenuation is selected.

At step S70 the centre frequency of the channel filter is set to this value and in this way improved attenuation of signals from neighbouring channels is achieved and an improved adjacent channel selectivity is provided. It should be noted that where these measurements are made as background measurements prior to the irregular channel being used by the network then step S70 is not performed at this point, and the results of the comparison are simply stored ready for when the network does switch to using that particular irregular bandwidth channel, whereupon the results of the comparison are retrieved and step S70 performed.

FIG. 9 schematically shows a user equipment UE 5 according to an example embodiment. UE 5 has in this example embodiment receiving circuitry 8 for receiving signals, the receiving circuitry comprising down conversion means for down converting the frequency of the received signal and two channel filters 10A, 10B with different bandwidths. In this example embodiment channel filter 10A acts as a bandpass filter with a pass band of 5 MHz whereas channel filter 10B acts as a bandpass filter with a pass band of 10 MHz. UE 5 also has control circuitry 12 that is configured to control which channel filter is used for received signals and identifying circuitry 20 for identifying a preferred centre frequency of the operational channel filter. The identifying circuitry 20 comprises adjusting circuitry 22 for adjusting an effective centre frequency of the channel filter 10A, or 10B, determining circuitry 24 for determining a level of adjacent channel selectivity of signals filtered by the operational channel filter 10A or 10B and a comparator 26 for comparing the different levels of adjacent channel selectivity that are determined by determining circuitry 24 such that a preferred centre frequency can be identified, the preferred centre frequency being the centre frequency provides a highest level of adjacent channel selectivity.

Once the preferred centre frequency for a particular channel filter has been identified by the identifying means 20 then adjusting circuitry 22 may adjust the effective centre frequency of the operational channel filter to the preferred value when the channel filter is operational and an irregular bandwidth channel is being received. In some embodiments the effective centre frequency may be adjusted by adjusting at the down conversion means the frequency of the signals input to the channel filter.

The control circuitry 12 may act to trigger the identifying circuitry 20 to identify a preferred centre frequency of a particular channel filter at particular times where it considers that this value is required and/or that an update of a previously determined value may be helpful. It may do this periodically at predefined timed intervals and/or it may do it in response to determining that signal conditions at the UE are good such that measurements can be tolerated without unduly affect the UE performance. This may be for example where a power of a received signal is above a predetermined level or where a signals to interference and noise ratio is above a predetermined level, The control circuitry may also trigger these measurements to be performed when it determines that the UE is moving above a predetermined speed. Where a UE is moving fast then the adjacent channel conditions are likely to change and thus, the preferred centre frequency may also change.

In summary, example embodiments provide a way of improving UE performance in terms of robustness toward adjacent channel interference at the UE without the need for NW signalling.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
at least one channel filter for filtering received wireless communication signals, said at least one channel filter passing signals within a predefined bandwidth and attenuating signals that are outside of said predefined bandwidth;
circuitry configured to identify a preferred centre frequency for said at least one channel filter, said circuitry configured to identify comprising:
circuitry configured to adjust an effective centre frequency of said at least one channel filter;
circuitry configured to determine a level of adjacent channel selectivity of signals filtered by said at least one channel filter;
circuitry configured to compare a level of adjacent channel selectivity at different centre frequencies of said at least one channel filter and to identify said preferred centre frequency as said centre frequency that provides a highest level of adjacent channel selectivity; and
circuitry configured to control, said circuitry configured to control being responsive to receipt of a network signal indicating that at least one irregular bandwidth channel that does not correspond to said bandwidth of said at least one channel filter is supported by said network to:
select one of said at least one channel filter that has a wider bandwidth than said at least one irregular bandwidth; and to
trigger said circuitry configured to identify to identify a preferred centre frequency for said selected channel filter,
wherein said circuitry configured to adjust is configured to adjust said effective centre frequency to different centre frequencies by:
increasing said effective centre frequency by an amount equal to half the difference between a bandwidth of said selected channel filter and said irregular bandwidth; and
decreasing said effective centre frequency by said amount.

2. An apparatus according to claim 1, said apparatus being responsive to said circuitry configured to identify identifying an updated preferred centre frequency to adjust said effective centre frequency of said at least one channel filter to said updated preferred centre frequency.

3. An apparatus according to claim 1, wherein
said circuitry configured to determine said level of adjacent channel selectivity comprises circuitry configured to determine a signal to interference and noise ratio, an increase in signal to interference and noise ratio being indicative of an increase in attenuation of adjacent channel interference.

4. An apparatus according to claim 1, wherein said network signal comprises a signal indicating a change to a downlink channel comprising an irregular bandwidth.

5. An apparatus according to claim 1, wherein said circuitry configured to control is configured to trigger said circuitry configured to identify said preferred centre frequency for said at least one channel filter, in response to at least one of:
a predefined time interval;
a power of a received signal being above a predetermined level;
a signal to interference and noise ratio; and
an indication that said apparatus is moving above a predetermined speed.

6. An apparatus according to claim 1, wherein the circuitry configured to identify and the circuitry configured to control comprise: at least one processor; and at least one memory including computer program code, the at least one memory and computer program code being configured to, with the at least one processor, cause the performance of the apparatus.

7. A method comprising:
filtering received wireless communication signals using at least one channel filter;
identifying a preferred centre frequency for said at least one channel filter by:
adjusting an effective centre frequency of said at least one channel filter;
determining a level of adjacent channel selectivity of signals filtered by said at least one channel filter;
comparing a level of adjacent channel selectivity at different centre frequencies of said at least one channel filter; and
identifying said preferred centre frequency as said centre frequency that provides a highest level of adjacent channel selectivity; and
in response to receipt of a network signal indicating that an irregular bandwidth channel that does not correspond to a bandwidth of said at least one channel filter is supported by said network:
selecting one of said at least one channel filter that has a wider bandwidth than said irregular bandwidth channel; and
initiating said identifying steps to identify a preferred centre frequency for said selected channel filter,
wherein said adjusting said effective centre frequency comprises adjusting said effective centre frequency to different centre frequencies by:
increasing said effective centre frequency by an amount equal to half the difference between a bandwidth of said selected channel filter and said irregular bandwidth channel; and
decreasing said effective centre frequency by said amount.

8. A method according to claim 7, said method comprising a further step of adjusting said effective centre frequency of said at least one channel filter to said preferred centre frequency.

9. A method according to claim 7, wherein said determining said level of adjacent channel selectivity comprises determining a signal to interference and noise ratio, an increase in signal to interference and noise ratio being indicative of an increase in adjacent channel selectivity.

10. A method according to claim 7, said method comprising:

performing said identifying said preferred centre frequency for said at least one channel filter, in response to at least one of:

a predefined time interval;

a power of a received signal being above a predetermined level;

a signal to interference and noise ratio; and an indication that said apparatus is moving above a predetermined speed.

11. A non-transitory computer readable medium comprising program instructions which, when executed by a processor on an apparatus, cause said apparatus to perform a method according to claim 7.

12. An apparatus according to claim 1, wherein said apparatus comprises a user equipment.

13. An apparatus comprising:

at least one processor; and at least one memory storing instructions that when executed by the at least one processor cause the apparatus at least to perform:

identifying a preferred centre frequency for at least one channel filter for filtering received wireless communication signals by:

adjusting an effective centre frequency of said at least one channel filter;

determining a level of adjacent channel selectivity of signals filtered by said at least one channel filter;

comparing a level of adjacent channel selectivity at different centre frequencies of said at least one channel filter; and identifying said preferred centre frequency as said centre frequency that provides a highest level of adjacent channel selectivity; and in response to receipt of a network signal indicating that an irregular bandwidth channel that does not correspond to a bandwidth of said at least one channel filter is supported by said network:

selecting one of said at least one channel filter that has a wider bandwidth than said irregular bandwidth channel; and initiating said identifying steps to identify a preferred centre frequency for said selected channel filter, wherein said adjusting said effective centre frequency comprises adjusting said effective centre frequency to different centre frequencies by:

increasing said effective centre frequency by an amount equal to half the difference between a bandwidth of said selected channel filter and said irregular bandwidth channel; and decreasing said effective centre frequency by said amount.

14. An apparatus according to claim 13, wherein said instructions that when executed by the at least one processor cause the apparatus at least to perform a further step of adjusting said effective centre frequency of said at least one channel filter to said preferred centre frequency.

15. An apparatus according to claim 13, wherein said determining said level of adjacent channel selectivity comprises determining a signal to interference and noise ratio, an increase in signal to interference and noise ratio being indicative of an increase in adjacent channel selectivity.

16. An apparatus according to claim 13, wherein said instructions that when executed by the at least one processor cause the apparatus to perform the step of identifying said preferred centre frequency for said at least one channel filter, in response to at least one of:

a predefined time interval;

a power of a received signal being above a predetermined level;

a signal to interference and noise ratio; and an indication that said apparatus is moving above a predetermined speed.

17. An apparatus according to claim 13, wherein said apparatus comprises a user equipment.

* * * * *